May 1, 1956 J. B. BALLENTINE 2,744,082
DISSOLUTION OF ACRYLONITRILE POLYMERS
Filed Aug. 17, 1951
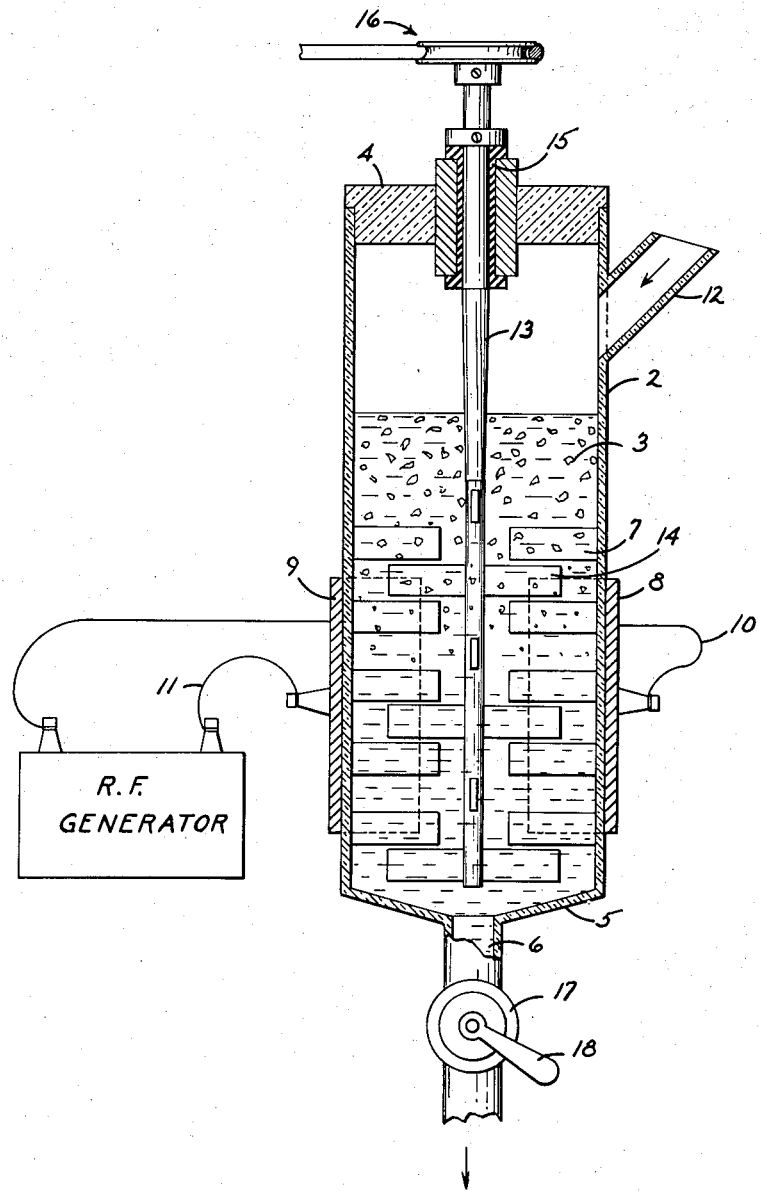
INVENTOR.
JAMES B. BALLENTINE
BY
*Thomas R. O'Nally*
ATTORNEY.

United States Patent Office 2,744,082
Patented May 1, 1956

2,744,082

DISSOLUTION OF ACRYLONITRILE POLYMERS

James B. Ballentine, Media, Pa., assignor, by mesne assignments, to The Chemstrand Corporation, Philadelphia, Pa., a corporation of Delaware Application August 17, 1951, Serial No. 242,392

11 Claims. (Cl. 260—32.6)

This invention relates to the preparation of solutions of polymeric materials and more particularly to the dissolution of acrylonitrile polymers.

Difficulty is encountered in dissolving acrylonitrile polymers containing, by weight in the polymer molecule, at least 70% of acrylonitrile by the ordinary method of stirring the polymer with the solvent because of the tendency of the polymer particles to swell and aggregate or coalesce into balls. Under conventional conditions, the polymer is not always completely dissolved, even when the dispersion is heated at elevated temperatures with vigorous stirring, and swollen undissolved gel particles often exist in the final solution. The problem of producing a clear solution of the fiber-forming acrylonitrile polymers high in acrylonitrile content is recognized in Houtz U. S. 2,404,713. That patent discloses a method of dissolving the polymers by dispersing the particulate polymer in the selected solvent, at low temperature, and then elevating the temperature to complete the dissolution. Under the conditions exemplified in the patent, a particulate acrylonitrile polymer is dispersed in dimethylformamide cooled to 0. °C, and a viscous, doughlike mass of discrete particles is obtained, which mass is then heated over a period of 45 minutes to 150° C. to effect complete dissolution of the polymer.

The viscosity characteristics of the mass change during heating thereof, but all portions of the mass are heated to 150° C. in order to completely dissolve the polymer and obtain a stable solution.

It is found that actually a major portion of the polymer is dissolved at comparatively low temperatures, and that at those temperatures the mass comprises a true solution of the polymer and undissolved gel particles which must be heated to higher temperatures for dissolution.

If the heat required to dissolve the swollen gel particles present in a mass comprising a true solution of the polymer is supplied by the usual direct heating methods heretofore employed, the temperature of all portions of the mass, including the solution, is necessarily raised with danger of over-heating of the solution, which is already satisfactory for spinning into fibers, in order to solubilize the relatively small, residual solute fraction existing in the form of the swollen gel particles. This is disadvantageous. The common organic solvents for the polymers such as dimethylformamide and dimethylacetamide are volatile and liberate an amine on heating, the evolution of which has an unfavorable effect on the color of shaped articles formed from the solution. In addition, the mere use of high temperatures for any appreciable time affects the acrylonitrile polymer itself adversely, leading, eventually, to marked discoloration and a decrease in the solubility of the polymer in the given solvent.

It has been discovered that a solution of an acrylonitrile polymer containing at least 70% of acrylonitrile by weight in the molecule absorbs less energy from a high frequency electric field than do the partially swollen or gel particles which exist in the mass obtained by dispersing the particulate polymer in the selected solvent, and when the mass comprising such a solution and the swollen undissolved gel particles is heated dielectrically to the elevated temperature at which dissolution of the gel particles occurs, the solution is not substantially heated.

In accordance with the invention, therefore, the particulate acrylonitrile polymer is dispersed in a suitable solvent at room temperature, with stirring, to obtain a mass which is then subjected to an electrostatic field maintained by the use of a high voltage alternating current of a frequency, for example, in the neighborhood of 30–40 megacycles or higher.

Although the dry acrylonitrile polymers are not heated at all in a high frequency electric field, and the solvents for those polymers, such as dimethylacetamide and dimethylformamide, are heated but slowly in such a field, the dispersion of the polymer in the solvent is heated very rapidly evidently because some gel particles are formed instantaneously when the particulate polymer is dispersed in the solvent. Since the major portion of the polymer is dissolved at comparatively low temperatures, and the solution thereafter is not directly heated to any substantial extent by the absorption of energy from the radio frequency field, the undissolved swollen gel particles, which do absorb energy from the field are selectively heated and dissolved. The gel particles are dissolved and absorbed into the surrounding fluid medium with rapid dissipation of the heat of solution, after very brief exposure to the high frequency electric current. Therefore, only that portion of the mass which is operationally troublesome, the undissolved gel particles present after the bulk of the polymer has been dissolved at comparatively low temperatures, is heated to temperatures over 100° C. It is unnecessary to overheat any portion of the mass, either by needless exposure to excessively high temperatures or by prolonged heating at any temperature, in order to solubilize the relatively small solute fraction which resists solvation at lower temperatures. In most cases, a homogeneous solution of the polymer is obtained at substantially lower temperatures than are normally required for dissolving all of the particulate polymer. Thus, whereas an ultimate temperature of 150° C. is required for obtaining a homogeneous and stable solution according to the prior art, substantially gel-free homogeneous and stable solutions have been obtained, using the present method, at temperatures between 80 and 100° C.

The dispersion may be heated dielectrically in any practical manner, using any suitable apparatus in which the dispersion does not come into contact directly with the electrodes. In the preferred embodiment, the dissolution of the polymer is performed continuously, a stream of the dispersion of the polymer in the solvent being passed continuously into and through the high frequency electric field and a substantially homogeneous solution being withdrawn continuously from the field to a collection vessel.

The acrylonitrile polymer which is dissolved in accordance with the invention may be polyacrylonitrile or a copolymer or interpolymer of at least 70% acrylonitrile with one or more other monomeric substances containing the C=C linkage which are polymerizable with acrylonitrile, including acids such as acrylic, haloacrylic and methacrylic acids, esters such as methyl methacrylate, butyl, octyl, methoxymethyl, and chloroethyl methacrylate and the corresponding esters of acrylic and alpha-chloracrylic acids; methacrylonitrile, vinyl and vinylidene halides such as vinyl chloride, vinyl fluoride, vinylidene chloride, vinylidene fluoride, 1-fluoro-1-chlorethylene; vinyl carboxylates such as vinyl acetate, vinyl chloracetate, vinyl propionate, and N-vinyl succinimide; N-vinyl lactams such as N-vinylcaprolactam and N-vinyl butyrolactam; vinyl aryl compounds such as styrene and vinyl naphthalene; and other compounds such as methyl vinyl ketone, chlorotrifluorethylene, methyl fumarate, methyl vinyl sulfone, methyl vinyl sulfoxide, methyl vinyl sulfide, fumaronitrile, and maleic anhydride.

The polymeric material which is dispersed in the solvent and heated dielectrically may also be a blend of a base acrylonitrile polymer, including interpolymers as before mentioned, with a modifying polymeric material and preferably with one or more other acrylonitrile polymers. For example, the blend may comprise a base polymer such as polyacrylonitrile or a copolymer of from 90 to 98% of acrylonitrile and 2 to 10% of vinyl acetate, vinyl chloride, or any of the other above-enumerated monoethylenically unsaturated monomers, with from 2 to 50% on the weight of the blend of a copolymer of from 10 to 70% of acrylonitrile and from 30 to 90% of a polymerizable monomer containing basic tertiary nitrogen for example, a vinyl-substituted tertiary heterocyclic amine, such as a 2-vinyl-pyridine or a 2-methyl vinyl-substituted pyridine, preferably of from 45–55% of acrylonitrile and from 55 to 45% of the vinylpyridine, which imparts receptivity for the acid wool type dyestuffs to the blend.

The invention will be more readily understood by reference to the accompanying drawing in which the single figure is a schematic illustration of one form of apparatus suitable for carrying out the method.

Referring to the drawing, there is shown a cylindrical vessel 2 formed of a non-conductive material, preferably Pyrex glass for containing the dispersion 3. The vessel is provided with a cover or stopper 4, and has a downwardly sloped bottom wall 5 terminating in a restricted outlet 6 which may deliver to a storage tank or directly to the spinning line, if the solution is to be spun into fibers. The inner wall of the vessel is provided with stationary protruding dasher-type blades 7. A pair of arcuate electrodes 8 and 9 formed, for example, of copper plate, are fixed to opposite sides of the external wall of vessel 2 and connected to a suitable known type of high frequency generator by the conductors 10 and 11.

The dispersion of the acrylonitrile polymer in the selected solvent, for instance in dimethylformamide or dimethylacetamide, is fed into vessel 2 through the inlet 12 and passes downwardly through the high frequency electric field to the outlet 6. In order to inhibit or prevent the formation of "lumps" or "dumplings" in the dispersion before it enters the field or while passing therethrough, or to break up any "dumplings" already existing in the dispersion as a result of agglomeration of the polymer particles, the dispersion is agitated by means of a dasher-type stirrer 13 preferably formed of Pyrex glass and provided with the dasher-type rotor blades 14 staggered to fit between the glass stator blades protruding from the internal wall of vessel 2. The stirrer 13 is supported in the resilient bearing 15 and rotated, for example, by belt and pulley means 16 at its upper end, the belt being driven from any suitable source of power.

Stirrer 13 is rotated at a predetermined speed to insure circulation of the dispersion and break-up of any lumps present therein by the shearing action to which the dispersion is subjected between the blades of the stirrer and the stationary blades 7.

A high frequency generator having a capacity of 2 kw. and a frequency variable from about 30 megacycles to 40 megacycles, and arranged to apply a high frequency current to the electrodes at about 2000 to 5000 volts may be used in practicing the invention. The undissolved polymer present in the dispersion is heated and dissolved under the influence of the high frequency electric current applied thereto through the wall of vessel 2.

The gel-free solution obtained by passing the dispersion through the high frequency electric field accumulates at the bottom of the tank and is taken off at a rate commensurate with its formation. Feed of the dispersion to the vessel 2 and withdrawal of the solution through outlet 6 are preferably, though not necessarily, performed continuously. Any suitable means may be provided for regulating the rate of take-off. As shown, a ground glass stop-cock 17 is provided, and is equipped with a handle 18 for manual adjustment as required.

Using the above-mentioned high frequency generator, a dispersion obtained by mixing 15 lbs. of a copolymer of 92% acrylonitrile and 8% of vinyl acetate with 85 lbs. of dimethylformamide was passed through the high frequency electric field and agitated as it passed therethrough. Heating of the mass by the high frequency electric current simultaneously with agitation of the mass effects rapid dissolution of the polymer. Under the conditions described, the temperature of the undissolved gel particles present in the mass was elevated in the field to about 80–100° C. and a gel-free, homogeneous solution was obtained in 2–10 minutes, without overheating of any portion of the mass.

It will be understood that the invention is not limited to the use of the particular apparatus shown.

The dissolution may be performed on a batch basis, or the solvent and polymer may be introduced separately into the vessel and mixed to form a dispersion which flows downwardly through the field, the relative proportions of polymer to solvent being selected to produce a solution of the predetermined concentration and the rate of feed of the polymer and solvent to the vessel being correlated with the rate of draw-off of the homogeneous solution produced in the field. Thus, the apparatus shown may be modified to provide two inlets through which the solvent and particulate polymer may be introduced separately. Also, two or more pairs of electrodes may be fixed to the external wall of the vessel, one pair being spaced from the other along the wall length, so that the mass of solvent and polymer passes through a plurality of high frequency electric fields, in which it may be subjected to current of the same or different potentials, before it is withdrawn from the vessel.

The invention provides a method for rapidly and safely dissolving the difficultly soluble acrylonitrile polymers which results in smooth, clear solutions adapted to be formed into fibers and other shaped articles of improved physical properties.

Various changes and modifications may be made in carrying out the invention as described without departing from the spirit and scope of the invention as defined by the appended claims.

I claim:

1. The method of producing a clear, substantially gel-free and homogeneous solution of an acrylonitrile polymer containing at least 70 percent of acrylonitrile in the polymer molecule comprising the steps of dispersing the polymer in particulate form in a solvent therefor at room temperature, subjecting the dispersion to an electrostatic field maintained by a high voltage alternating current of a frequency of at least 30 megacycles, and heating the polymer particles to a temperature at which dissolution thereof takes place without substantially heating the polymer solution above 100° C. to effect complete dissolution of the polymer particles, the heat of solution of the polymer particles being dissipated in the polymer solution and said polymer solution being maintained at a temperature less than the dissolution temperature of the polymer particles.

2. The method as defined in claim 1 wherein the dispersion is continuously agitated while it is subjected to the electrostatic field.

3. The method of producing a clear, substantially gel-free and homogeneous solution of an acrylonitrile polymer containing at least 70 percent acrylonitrile in the polymer molecule comprising the steps of dispersing the polymer in particulate form in a solvent therefor at room temperature, continuously moving the mass thus obtained through an electrostatic field maintained by a high voltage alternating current of a frequency of at least 30 megacycles, and heating the polymer particles to a temperature at which dissolution thereof takes place without substantially heating the polymer solution above 100° C. to effect complete dissolution of the polymer particles, continuously agitating the mass as it moves through the field, and continuously withdrawing the solution produced in the field from the vicinity of the field, the heat of solution of the polymer particles being dissipated in the polymer solution and said polymer solution being maintained at a temperature less than the dissolution temperature of the polymer particles.

4. The method of claim 3 wherein the mass is moved continuously through a high frequency electrostatic field established between conductive surfaces.

5. The method of claim 3, wherein the acrylonitrile polymer is dispersed in dimethylacetamide.

6. The method of claim 3, wherein the acrylonitrile polymer is dispersed in dimethylformamide.

7. The method of claim 3, wherein the mass moved through the electrostatic field comprises a dispersion of a blend of a base acrylonitrile polymer containing at least 70% of acrylonitrile by weight in the polymer molecule with from 2 to 50% on the weight of the blend of a copolymer of from 10 to 70% of acrylonitrile and from 30 to 90% of a vinyl-substituted tertiary heterocyclic amine, in dimethylacetamide.

8. The method of claim 3, wherein the mass moved through the electrostatic field comprises a dispersion of a blend of a base acrylonitrile polymer containing at least 70% of acrylonitrile by weight in the polymer molecule with from 2 to 50% on the weight of the blend of a copolymer of from 10 to 70% of acrylonitrile and from 30 to 90% of a vinyl-substituted tertiary heterocyclic amine, in dimethylformamide.

9. The method of claim 3, wherein the mass moved through the electrostatic field comprises a dispersion of a blend of a base acrylonitrile polymer containing at least 70% of acrylonitrile with from 2 to 50% on the weight of the blend of a copolymer of from 45 to 55% of acrylonitrile and, conversely, from 55 to 45% of a vinylpyridine.

10. The method of claim 3, wherein the mass moved through the electrostatic field comprises a dispersion of a blend of a base polymer containing from 90 to 98% of acrylonitrile and from 2 to 10% vinyl acetate with from 2 to 50% on the weight of the blend of a modifying copolymer of from 45 to 55% of acrylonitrile and conversely from 55 to 45% of a vinylpyridine.

11. The method of producing a clear, substantially gel-free and homogeneous solution of an acrylonitrile polymer containing at least 70 percent of acrylonitrile in a polymer molecule comprising the steps of dispersing the polymer in particulate form in a solvent therefor at room temperature, subjecting the dispersion to an electrostatic field maintained by a high voltage alternating current of a frequency of at least 30 megacycles, and simultaneously with passage of the dispersion through the field subjecting it to a shearing force to thereby break up any gel particles present therein while any such gel particles are heated by the field to a temperature at which dissolution thereof takes place without substantially heating the polymer solution above 100° C. to effect complete dissolution of the gel particles, the heat of solution of the gel particles being dissipated in the polymer solution and said polymer solution being maintained at a temperature less than the dissolution temperature of the gel particles.

References Cited in the file of this patent
UNITED STATES PATENTS

| | | |
|---|---|---|
| 2,404,713 | Houtz | July 23, 1946 |
| 2,531,407 | D'Alelio | Nov. 28, 1950 |
| 2,555,284 | Besse | May 29, 1951 |
| 2,589,417 | Mittelman | Mar. 18, 1952 |

FOREIGN PATENTS

| | | |
|---|---|---|
| 607,690 | Great Britain | Sept. 3, 1948 |